United States Patent

Slevin et al.

Patent Number: 5,112,399
Date of Patent: May 12, 1992

[54] PLAIN PAPER INKS

[75] Inventors: Leonard Slevin, San Diego; Mark S. Hickman, Escondido, both of Calif.

[73] Assignee: Hewlett-Packard Company, Palo Alto, Calif.

[21] Appl. No.: 649,123

[22] Filed: Jan. 28, 1991

Related U.S. Application Data

[63] Continuation-in-part of Ser. No. 378,113, Jul. 11, 1989, abandoned.

[51] Int. Cl.$^5$ ............................................. C09D 11/02
[52] U.S. Cl. ....................................... 106/22; 106/25; 106/217
[58] Field of Search ........................... 106/22, 25, 217

[56] References Cited

U.S. PATENT DOCUMENTS

| | | | |
|---|---|---|---|
| 2,771,374 | 11/1956 | Chambers et al. | 106/25 |
| 2,868,741 | 1/1959 | Chambers et al. | 106/25 |
| 4,197,222 | 4/1980 | Wegmann | 106/22 |
| 4,212,643 | 7/1980 | Kölliker | 106/22 |
| 4,257,768 | 3/1981 | Racciato et al. | 106/209 |
| 4,310,356 | 1/1982 | Trubiano et al. | 106/25 |
| 4,388,115 | 6/1983 | Sugiyama et al. | 106/22 |
| 4,425,162 | 1/1984 | Sugiyama et al. | 106/22 |
| 4,509,982 | 4/1985 | Iijiwa | 106/25 |
| 4,512,807 | 4/1985 | Ogawa et al. | 106/22 |
| 4,671,691 | 6/1987 | Case et al. | 106/25 |
| 4,838,940 | 6/1989 | Kan et al. | 106/22 |
| 4,881,084 | 11/1989 | Kan et al. | 106/25 |
| 4,920,361 | 4/1990 | Arahara et al. | 106/20 |
| 4,962,389 | 10/1990 | Kan et al. | 106/20 |
| 5,017,223 | 5/1991 | Kobayashi et al. | 106/22 |

Primary Examiner—William R. Dixon, Jr.
Assistant Examiner—Helene Klemanski

[57] ABSTRACT

Inks for printing on plain papers are provided for thermal ink-jet printers. The inks comprise a vehicle comprising about 5 to 20 wt % of a glycol or glycol ether and the balance water, about 1 to 6% of a dye, and about 0.1 to 1% of an alginate. The alginate increases the viscosity to increase the frequency of operation. Unexpectedly, good print quality associated with lower frequency of operation is retained at the higher frequency of operation.

12 Claims, No Drawings

PLAIN PAPER INKS

CROSS-REFERENCE TO RELATED APPLICATION

The present application is a continuation-in-part application of Ser. No. 07/378,113, filed Jul. 11, 1989, now abandoned.

TECHNICAL FIELD

The present invention relates generally to inks used in thermal ink-jet printers, and more particularly, to ink compositions suitable for printing on plain paper.

BACKGROUND ART

Thermal ink-jet printers employ a plurality of resistors to fire droplets of ink through nozzles toward a medium, such as paper, in a pattern to form alphanumeric characters. It is desirable to use plain paper, rather than specially coated paper, as the print medium. However the matching of ink to paper is not easy, and many considerations, such as properties of the ink, reaction of the ink composition with the thermal ink-jet printhead, and interaction of the ink with the print medium, must be addressed.

An ink that gives good print quality on paper must also perform well in the printhead. As used herein, print quality is measured in terms of small dot size for a given drop volume. A 100 picoliter drop volume is typically used as a convenient reference.

An ink that performs well evidences low spray, good directionality as ejected from the nozzle, and fast firing frequency. By low spray is meant that the area around the perimeter of a printed character should be clear of stray droplets. By good directionality is meant that the angular deviation of an ejected droplet of ink from a nozzle should be within about ±0.5° from the normal to the plane of the nozzle. By fast firing frequency is meant a firing rate of at least about 4 to 5 kHz. Such higher firing rates permit faster printing.

There are presently several thermal ink-jet printers that operate in the range of about 2.6 to 3.6 kHz. An ink composition presently used with such printers comprises a vehicle of about 95% water and about 5% diethylene glycol (DEG) and a dye of about 2.5% (all amounts in percent are by weight, unless otherwise indicated). Other additives, such as biocides and pH adjusters, may also be present.

While such low DEG (<10%) inks are suitable for the purpose intended and evidence good print quality (e.g., low feathering and low bleed) on plain paper, there remain severe problems with spray, directionality, and crusting of the nozzles by the ink. Further, this ink composition is limited to firing frequencies below about 3 kHz.

There are other printers, using special papers, that are characterized by good print quality on such special papers. These printers employ a high DEG (50 to 70%) ink. The print quality of such inks on plain paper is degraded compared with that on the special papers, and such inks evidence slow drying on plain paper. On the other hand, crusting is relieved by the use of the high DEG ink, and it has been discovered that these higher viscosity inks are capable of firing at the higher frequencies mentioned above.

Thus, there remains a need to provide an ink composition having the best properties of both compositions: the good dry time and print quality on plain paper, together with the desire to print on plain paper at the higher frequencies.

DISCLOSURE OF INVENTION

In accordance with the invention, an ink composition is provided, consisting essentially of (a) a vehicle comprising about 5 to 20 wt % of a glycol or glycol ether commonly employed in thermal ink-jet inks and the balance water (b) a dye in the amount of about 1 to 6% of the ink composition, and (c) about 0.1 to 1.0% of an alginate to increase the viscosity of the ink.

The compositions of the invention evidence reduced spray, improved directionality, and higher firing frequency than ink compositions without the alginate. Importantly, the use of the alginate increases the viscosity, which permits firing at higher frequencies. Unexpectedly, however, the good print quality that is obtained at the lower frequencies is also retained at the higher frequencies (print quality at higher frequencies is often sacrificed by use of other viscosity modifiers, such as DEG). Thus, the good print quality on plain paper is retained, with small dot size for a given drop volume and control of spray.

BEST MODES FOR CARRYING OUT THE INVENTION

The compositions of the invention are characterized by the presence of a viscosity modifier, specifically, an alginate. Such alginates may comprise any of the salts of alginic acid, which is a mixture of two acids, poly-α-L-Gulopyranosyluronic acid and poly-β-D-Mannopyranosyluronic acid. Sodium and calcium cations are usually present in commercially-available alginates, although other cations, such as lithium, potassium, ammonium and substituted-ammonium ions, may also be used. Alginates with various ratios of $Na^+$ and $Ca^{++}$ are commercially available.

As is known, alginic acid is a carbohydrate of marine algae, obtained as a by-product in the preparation of iodine from brown kelp. Common sources of brown kelp include macrocystis pyrifera, ascophyllum nodusum, laminaria digitata, eklonia cava, and esenia bicyclis. Alginates are commercially available from Kelco, a division of Merck and Company, Chicago, Ill.

Alginates are known to increase the viscosity in various systems; however, the addition of alginates to thermal ink-jet inks, while also increasing the viscosity thereof, provides the following unexpected and surprising result: retention of good print quality at higher operating frequencies.

The ink compositions benefited in accordance with the invention comprise a vehicle comprising water and one or more glycols or glycol ethers commonly used in ink-jet printing. Examples of such glycols include ethylene glycol, propylene glycol, diethylene glycol, dipropylene glycol and polyethylene glycols, although this list is not all-inclusive. Further, the vehicle may include one or more low carbon chain alcohols, such as methanol, ethanol, propanol, and butanol, and glycerol. Preferable, diethylene glycol (DEG) is employed.

The glycol or glycol ether is employed in an amount ranging from about 5 to 20 wt %, since at higher concentrations, unacceptable feathering of the ink is observed. The balance of the ink vehicle is water. Preferably, the amount of glycol or glycol ether, specifically, DEG, is about 5 to 10%.

The dye employed in the ink may range from about 1 to 6% of the ink composition (vehicle plus dye plus additives). However, the dye preferably ranges from about 2 to 3%. Such a range provides sufficient intensity, and avoids potential crusting problems obtained at higher concentrations of dye.

The dye may comprise any of the dyes commonly used in ink-jet printing. An example of a black dye is Food Black 2. However, it is preferred that the sodium ions on this dye be partially or totally replaced, as described elsewhere, for reduced crusting. Suitable replacement cations include tetramethylammonium and lithium.

The ink may also include various additives, such as bactericides commonly employed in ink-jet inks and antiyeast and anti-mold agents such as proprionates and ascorbates. Further, materials to modify the pH, minimize crusting and/or reduce kogation may also be added to these inks.

The ink compositions of the invention may be printed at high frequencies similar to those available with high concentrations of DEG (on the order of 50%), yet the compositions retain the desirable print properties associated with low concentrations of DEG, such as reduced feathering, strike-through, bleed and dry time, and improved character crispness. Also, the print quality benefits of improved control of spray, directionality, drop volume variation, stable drop volume, and reduction in banding in area fill were also observed. These properties are usually lost when attempting to print at higher frequencies using other viscosity modifiers, such as increased DEG, JONCRYL-type additives (such as JONCRYL-89, which is a styrenated acrylic polymer emulsion available from S.C. Johnson Co.), CULMINAL MHPC-25 (which is a modified cellulose available from Aqualon Co.), DOW W-B640NA (which is a styrene-butadiene latex available from Dow Chemical Co.), CARTA RETIN F-4 (available from Sandoz Chemical), and polyethylene glycol stearate, and the like.

Finally, it is well-known that when printing on plain papers, the more expensive papers, which are sized with titanium dioxide (so-called acid papers), evidence superior print quality to the less expensive papers, which are sized with calcium carbonate (so-called alkaline papers). Unexpectedly, the alginate addition to the ink causes the print quality on the less expensive plain papers to be nearly equal to that of the print quality on the more expensive plain papers.

EXAMPLES

Ink compositions with Brookfield viscosities (12 rpm, 21° C.) ranging from about 3 to 14 mpas were prepared and tested in a variety of thermal ink-jet pens. Table I below lists a number of compositions both within and outside the scope of the invention.

TABLE I

| Compositions of Various Inks in %. | | | | |
|---|---|---|---|---|
| Example | Dye | Water | DEG | Alginate |
| 1 | 2.5 Li-FB2 | 87.6 | 9.5 | 0.36 K-XL |
| 2 | 2.5 Li-FB2 | 87.4 | 9.3 | 0.72 K-XL |
| 3 | 2.2 TMA-FB2 | 44.4 | 53.1 | 0.34 K-XL |
| 4 | 2.3 Li-FB2 | 92.0 | 5.4 | 0.35 K-A |
| 5 | 2.3 Li-FB2 | 92.0 | 5.4 | 0.35 K-LV |
| 6 | 2.3 Li-FB2 | 92.0 | 5.4 | 0.35 K-XL |
| 7 | 2.3 Li-FB2 | 92.3 | 5.4 | none |
| 8 | 2.4 Li-FB2 | 87.8 | 9.8 | none |
| 9 | 5% TMA-FB2 | 38 | 57 | none |

TABLE I-continued

| Compositions of Various Inks in %. | | | | |
|---|---|---|---|---|
| Example | Dye | Water | DEG | Alginate |

Notes:
Li-FB2 = Li-substituted Food Black 2
TMA-FB2 = Tetramethylammonium-substituted Food Black 2
K-XL = Kelgin XL
K-A = Kelgin A5C542    } Kelco
K-LV = KELTONE LV The properties of a number of the foregoing inks were determined are listed in Table II, below.

TABLE II

| | Properties of Inks. | | | | |
|---|---|---|---|---|---|
| Example | Visc. (mpas) | Surf. Tens. (dyne/cm) | Dot Diam. (mils) | Spray ($\mu$m) | Freq. (kHz) |
| 1 | 6.7 | 65.7 | 4.5 | 3.0(?) | 6 |
| 2 | 13.8 | — | — | — | — |
| 3 | 12.5 | 56.6 | — | — | — |
| 4 | 3.5 | 69.2 | 4.7 | 1.4 | — |
| 5 | 6.7 | 68.7 | 4.4 | 1.5 | 10 |
| 6 | 5.1 | 68.6 | 4.5 | 1.5 | — |
| 7 | 1.4 | 69.2 | 4.8 | 1.8 | 3.6 |
| 8 | 1.8 | 67.2 | 5.3 | 2.1 | — |
| 9 | 10.0 | 52.3 | — | — | — |

As seen in the foregoing Table II, the spot size control on plain paper and the control of spray with viscosity-modified alginate inks are best illustrated by ink #5 contrasted with ink #7. Further, the ability to fire the alginate-modified inks at higher frequencies is also evident.

Dot diameter is defined as the equivalent diameter in mils of a circle of the same area as the spot's area. The value listed here is the mean of the spot diameters as measured on three common copy papers—Xerox 4024, Willamette, and Ipco—which represent a broad gamut of commonly available photocopy papers. They have all been adjusted to the same drop volume, chosen as 100 pl, for consistency in the comparison.

Spray, measured in micrometers, is defined as the ratio of the area of the island satellites surrounding the line to the length of the line actually drawn. Therefore, it has the dimension of a length and is listed here in micrometers. 10 inch spray is defined as the above spray that is observable at a distance of 10 inches. The two papers used in this comparison were Xerox 4024 and Ipco.

Contrasting inks #7 and #8 illustrate the adverse effect of the addition of DEG on print quality when the ink is initially at 5.5% DEG. It will be observed that the alginate-modified ink, however, evidenced an improvement in print quality (smaller spot size for a fixed drop volume) even when the ink contained 9.5% DEG (compare inks #1 and #8).

The alginates employed in the foregoing study were characterized by their molecular weight range of 12,000 to 80,000 g/mole molecular weight. This molecular weight range provides a comparatively low viscosity additive and minimizes pseudo-plasticity commonly associated with alginate solutions at higher molecular weights which also have correspondingly higher viscosities. Used in the concentration range set forth herein, these comparatively low molecular weight alginates in ink provide a viscosity in the range of about 2 to 12 mpas, which is required for printing in thermal ink-jet printers. Further, the alginates employed in the practice of the invention provide an enhanced print quality and higher operating frequency, due to their low pseudo-plasticity, than is provided by alginates of higher molecular weight.

INDUSTRIAL APPLICABILITY

The ink compositions of the invention are expected to find use in thermal ink-jet printers. While the ink has been used on plain (photocopy) paper, it is anticipated that it will find used on a variety of papers, including bond, special ink-jet paper, and the like.

Thus, there has been disclosed an ink composition for ink-jet printers which evidences improved performance and superior print quality. In particular, the inclusion of an alginate in the ink permits improved control of dot size on plain paper, higher frequency of printer operation, and control of ink spray. Various changes and modifications of an obvious nature will be readily apparent to those skilled in this art, and all such changes and modifications are considered to fall within the scope of the invention, as defined by the appended claims.

What is claimed is:

1. A process for increasing the frequency of printing an ink in a thermal ink-jet printer, while retaining the print quality of said ink associated with printing at lower frequencies, said ink comprising a vehicle comprising about 5 to 20 wt % of a glycol or glycol ether and the balance water and about 1 to 6wt % of a dye, wherein the improvement comprises adding an alginate to said ink in the amount of about 0.1 to 1 wt % of said composition.

2. The process of claim 1 wherein said vehicle comprises about 5 to 20 wt % diethylene glycol and the balance water.

3. The process of claim 2 wherein said diethylene glycol ranges from about 5 to 10 wt %.

4. The process of claim 1 wherein said dye ranges from about 2 to 3 wt %.

5. The process of claim 1 wherein said alginate consists essentially of an alginate having a molecular weight ranging from about 12,000 to 80,000 g/mole molecular weight.

6. The process of claim 1 wherein said alginate comprises at least one salt of alginic acid.

7. A thermal ink-jet ink composition for thermal ink-jet printers comprising:
   (a) a vehicle comprising about 5 to 20 wt % of a glycol or glycol ether and the balance water;
   (b) about 1 to 6 wt % of a dye;
   (c) about 0.1 to 1 wt % of an alginate.

8. The ink composition of claim 7 wherein said vehicle comprises about 5 to 20 wt % diethylene glycol and the balance water.

9. The ink composition of claim 8 wherein said diethylene glycol ranges from about 5 to 10 wt %.

10. The ink composition of claim 7 wherein said dye ranges from about 2 to 3 wt %.

11. The ink composition of claim 7 wherein said alginate consists essentially of an alginate having a molecular weight ranging from about 12,000 to 80,000 g/mole molecular weight.

12. The ink composition of claim 7 wherein said alginate comprises at least one salt of alginic acid.

* * * * *